United States Patent
Schade et al.

(10) Patent No.: US 6,444,767 B1
(45) Date of Patent: Sep. 3, 2002

(54) METHOD FOR RETARDED ANIONIC POLYMERIZATION

(75) Inventors: Christian Schade, Ludwigshafen; Wolfgang Fischer, Walldorf; Hermann Gausepohl, Mutterstadt; Rainer Klostermann, Ketsch; Volker Warzelhan, Weisenheim; Michel Fontanille, Talence; Alain Deffieux, Talence-Cedex; Philippe Desbois, Maikammer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,174

(22) PCT Filed: Feb. 5, 1999

(86) PCT No.: PCT/EP99/00766

§ 371 (c)(1),
(2), (4) Date: Aug. 14, 2000

(87) PCT Pub. No.: WO99/42498

PCT Pub. Date: Aug. 26, 1999

(30) Foreign Application Priority Data

Feb. 18, 1998 (DE) .......... 198 06 774

(51) Int. Cl.$^7$ .......... C08F 4/52; C08F 12/04; C08F 297/04

(52) U.S. Cl. .......... 526/177; 526/187; 526/346; 525/272; 525/314; 525/316; 502/153; 502/157

(58) Field of Search .......... 526/177, 187, 526/346; 502/153, 157; 525/272, 316, 314

(56) References Cited

U.S. PATENT DOCUMENTS

| 3,716,495 A | | 2/1973 | Hsieh | |
|---|---|---|---|---|
| 4,079,176 A | | 3/1978 | deZarauz | |
| 4,429,090 A | * | 1/1984 | Hall | .......... 526/177 |

FOREIGN PATENT DOCUMENTS

| DE | 26 28 380 | 12/1976 |
|---|---|---|
| EP | 234 512 | 9/1987 |
| WO | 97/33923 | 9/1997 |
| WO | 98/07765 | 2/1998 |

OTHER PUBLICATIONS

J.Am.Chem.Soc.vol. 82 (1960) 6000–6005; Welch.

* cited by examiner

*Primary Examiner*—Fred Teskin
(74) *Attorney, Agent, or Firm*—Keil & Weinkauf

(57) ABSTRACT

In a process for the homopolymerization of vinylaromatic monomers or the copolymerization of vinylaromatic monomers and dienes, the monomers are polymerized in the presence of at least one alkali metal organyl, at least one magnesium organyl and at least one aluminum organyl. The invention also provides an initiator composition for carrying out the process.

12 Claims, No Drawings

METHOD FOR RETARDED ANIONIC POLYMERIZATION

The present invention relates to a process for the homopolymerization of vinylaromatic monomers or the copolymerization of vinylaromatic monomers and dienes in the presence of at least one alkali metal organyl, at least one magnesium organyl and at least one aluminum organyl and to an initiator composition for carrying out the process.

Anionic polymerizations typically proceed very rapidly, so that they are difficult to control on an industrial scale owing to the considerable amount of heat generated. Lowering the polymerization temperature results in an excessive increase in viscosity, in particular with a concentrated solution. Reducing the initiator concentration increases the molecular weight of the polymer formed. Controlling the reaction by appropriate dilution of the monomers results in a higher solvent requirement and lower space-time yields.

It has therefore been proposed to include in the anionic polymerization initiators various additives to influence the polymerization rate.

The effect of Lewis acids and Lewis bases on the rate of the anionic polymerization of styrene has been described in Welch, Journal of the American Chemical Society, Vol 82 (1960), pages 6000–6005. For instance, it has been found that small amounts of Lewis bases such as ethers and amines accelerate the n-butyllithium-initiated polymerization of styrene at 30° C. in benzene, whereas Lewis acids such as zinc and aluminum alkyls reduce the polymerization rate or, when used in superstoichiometric amounts, stop the polymerization completely.

In Macromolecules, Vol 19 (1966), pages 299 to 304, Hsieh and Wang investigated the complexation of dibutylmagnesium with the alkyllithium initiator and/or with the living polymer chain in the presence and absence of tetrahydrofuran and found that dibutylmagnesium reduces the polymerization rate of styrene and butadiene without affecting the stereochemistry.

U.S. Pat. No. 3,716,495 discloses initiator compositions for the polymerization of conjugated dienes and vinylaromatics where a more efficient use of the lithium alkyl as initiator is achieved by the addition of a metal alkyl of a metal of group 2a, 2b or 3a of the Periodic Table of the Elements, such as diethyl zinc and polar compounds such as ethers or amines. Owing to the required large amounts of solvent, relatively low temperatures and long reaction times in the region of several hours, the space-time yields are correspondingly poor.

WO97/33923 describes initiator compositions which are used for the anionic polymerization of vinyl monomers and comprise alkali metal and magnesium compounds carrying hydrocarbon radicals and have a molar [Mg]/[alkali metal] ratio of at least 4.

PCT/EP97/04497, which was unpublished at the priority date of the present invention, describes continuous processes for the anionic polymerization or copolymerization of styrene or diene monomers using alkali metal alkyl as polymerization initiator in the presence of an at least bivalent element as a retarder.

Various initiator mixtures which may comprise alkali metals, alkaline earth metals, aluminum, zinc or rare earth metals are known, for example, from EP-A 0 234 512 for the polymerization of conjugated dienes with a high degree of 1,4-trans-linking. German Offenlegungsschrift 26 28 380 teaches, for example, the use of alkaline earth aluminates as cocatalyst in conjunction with an organolithium initiator for the preparation of polymers or copolymers of conjugated dienes having a high trans-1,4-linkage content and low 1,2-linkage or 3,4-linkage content. This is said to lead to an increase in polymerization rate.

Polydienes having a high proportion of 1,2-linking of the diene monomer units have been prepared using cyclic acetals of a glyoxal (U.S. Pat. Nos. 4,520,123, 4,591,624) or trisubstituted phosphine oxides (U.S. Pat. No. 4,530,984). In addition to the anionic initiators based on lithium, magnesium and/or aluminum alkyls can be used as coinitiators.

The use of additives such as aluminum alkyls which have a strong retarding effect on the anionic polymerization requires exact dosage and temperature control. A slight underdosage may lead to an insufficient retardation of the reaction rate, whereas a slight overdosage may completely stop the polymerization.

To achieve a sufficient retardation of the polymerization rate, weakly retarding additives such as magnesium dialkyls must be added in amounts which are significantly larger than the stoichiometric amount based on the alkali organyl initiator. The magnesium alkyls do not act as polymerization initiators on their own, but may initiate additional polymer chains in the presence of lithium organyls. The molecular weight of the polymers is therefore not only dependent on the molar ratio of alkali organyl initiator to monomer, but is also affected by the amount of magnesium organyl, the temperature and the concentration. In addition to higher costs, large amounts of retarding additives may also lead to altered product properties such as poor transparency, since the initiator components usually remain in the polymer.

It is an object of the present invention to provide a process for the homopolymerization of vinylaromatic monomers or the copolymerization of vinylaromatic monomers and dienes which does not have the abovementioned disadvantages, and, in particular, to provide an initiator composition for the process which makes it possible to adjust the polymerization rate within wide temperature and concentration ranges.

We have found that this object is achieved by a process for the homopolymerization of vinylaromatic monomers or the copolymerization of vinylaromatic monomers and dienes, which comprises polymerizing the monomers in the presence of at least one alkali metal organyl, at least one magnesium organyl and at least one aluminum organyl.

The invention also provides an initiator composition comprising at least one alkali metal organyl, at least one magnesium organyl and at least one aluminum organyl wherein a) the molar ratio of magnesium to alkali metal is in the range from 0.2 to 3.8, b) the molar ratio of aluminum to alkali metal is in the range from 0.2 to 4, and a process for the preparation of an initiator composition, in which the metal organyls, dissolved in inert hydrocarbons, are mixed together and aged at a temperature in the range from 0 to 120° C. for at least 5 minutes.

Alkali metal organyls which may be used are mono-, bi- or multifunctional alkali metal alkyls, aryls or aralkyls customarily used as anionic polymerization initiators. It is advantageous to use organolithium compounds such as ethyllithium, propyllithium, isopropyllithium, n-butyllithium, sec-butyllithium, tert-butyllithium, phenyllithium, diphenylhexyllithium, hexamethylenedilithium, butadienyllithium, isoprenyllithium, polystyryllithium or the multifunctional compounds 1,4-dilithiobutane, 1,4-dilithio-2-butene or 1,4-dilithiobenzene. The amount of alkali metal organyl required depends on the desired molecular weight, the type and amount of the other metal organyls used and the polymerization temperature and is typically in the range from 0.0001 to 5 mol percent, based on the total amount of monomers.

Magnesium organyls which may used are those of the formula $R_2Mg$, wherein the radicals R are each, independently of one another, hydrogen, halogen, $C-C_{20}$-alkyl or $C_6-C_{20}$-aryl. Preference is given to using the commercially available ethyl, propyl or butyl compounds. Particular preference is given to using (n-butyl)(s-butyl)magnesium which is soluble in hydrocarbons.

Aluminum organyls which may be used are those of the formula $R_3Al$, wherein the radicals R are each, independently of one another, hydrogen, halogen, $C_1-C_{20}$-alkyl or $C_6-C_{20}$-aryl. Preferred aluminum organyls are aluminum trialkyls such as triethylaluminum, triisobutylaluminum, tri-n-butylaluminum, triisopropylaluminum, tri-n-hexylaluminum. Particular preference is given to using triisobutylaluminum. It is also possible to use aluminum organyls which are formed by partial or complete hydrolysis, alcoholysis, aminolysis or oxidation of alkyl- or arylaluminum compounds or those which carry alkoxide, thiolate, amide, imide or phosphide groups. Examples are diethylaluminum ethoxide, diisobutylaluminum ethoxide, diisobutyl-(2,6-di-tert-butyl-4-methyl-phenoxy)aluminum (CAS No. 56252-56-3), methylaluminoxane, isobutylated methylaluminoxane, isobutylaluminoxane, tetraisobutyldialuminoxane, bis(diisobutyl)aluminum oxide or diethylaluminum (N,N-dibutylamide).

The molar ratios of the metal organyls with respect to each other may vary within wide limits, but depend primarily on the desired retardation effect, the polymerization temperature, the monomer composition and concentration and the desired molecular weight.

The molar ratio of magnesium to alkali metal is advantageously in the range from 0.1 to 10, preferably in the range from 0.2 to 3.8, particularly preferably in the range from 1 to 3. The molar ratio of aluminum to alkali metal is in the range from 0.1 to 10, preferably in the range from 0.2 to 4, particularly preferably in the range from 0.7 to 2. The molar ratio of magnesium to aluminum is preferably in the range from 0.05 to 8.

In the process of the invention use is made primarily of alkali metal organyls, magnesium organyls and aluminum organyls. Barium, calcium or strontium organyls are preferably only present in ineffective amounts not having a significant effect on the polymerization rate or copolymerization parameters. Transition metals or lanthanoids, especially titanium and zirconium, should not be present in significant amounts.

The alkali metal, magnesium and aluminum organyls may be added to the monomer mixture together or separately and at different times or different locations. The alkali metal, magnesium and aluminum alkyls are preferably used in the form of a premixed initiator composition.

The initiator composition may be prepared by dissolving the alkali metal organyls, the magnesium organyls and the aluminum organyls in an inert hydrocarbon solvent, for example n-hexane, n-heptane, cyclohexane, ethylbenzene or toluene, and combining the solutions. The metal organyls dissolved in the hydrocarbons are preferably mixed together and aged at a temperature in the range from 0 to 120° C. for at least 5 minutes. A solubilizer, for example diphenylethylene, can be added, if necessary, to prevent the precipitation of one of the components from this initiator solution.

The initiator solution is suitable for the polymerization of anionically polymerizable monomers. The initiator composition is preferably used for the homopolymerization or copolymerization of vinylaromatic monomers and dienes. Preferred monomers are styrene, α-methylstyrene, p-methylstyrene, ethylstyrene, tert-butylstyrene, vinyltoluene or 1,1-diphenylethylene, butadiene, isoprene, 2,3-dimethylbutadiene, 1,3-pentadiene, 1,3-hexadiene or piperylene or mixtures thereof.

The polymerization may be carried out in the presence of a solvent. Suitable solvents are the aliphatic, cycloaliphatic or aromatic hydrocarbons having from 4 to 12 carbon atoms which are generally used for anionic polymerization, such as pentane, hexane, heptane, cyclohexane, methylcyclohexane, isooctane, decalin, benzene, alkylbenzenes such as toluene, xylene, ethylbenzene or cumene or suitable mixtures. Obviously, the solvent should have the high purity which is typically required for the process. The solvent may be dried over aluminum oxide or molecular sieve and/or distilled prior to use to remove protic substances. The solvent from the process is preferably reused after condensation and the abovementioned purification.

It is possible to adjust the retarding effect within wide temperature ranges via the composition and amount of the metal organyls. It is therefore also possible to carry out the polymerization at initial monomer concentrations in the range from 50 to 100 percent by volume, particularly from 70 to 100 percent by volume, which lead to highly viscous polymer solutions and require higher temperatures, at least at higher conversions.

After the polymerization is completed, the living polymer chains may be capped with a chain terminator. Suitable chain terminators are protic substances or Lewis acids, such as water, alcohols, aliphatic or aromatic carboxylic acids and inorganic acids such as carbonic acid or boric acid.

The target products may be homopolymers or copolymers and mixtures thereof. Polystyrene and styrene/butadiene block copolymers are preferably obtained. The process of the invention may also be used to prepare high-impact polystyrene (HIPS), in which case polybutadiene, styrene/butadiene block copolymers or mixtures thereof may be used as rubbers.

The block copolymers may be coupled using multifunctional compounds such as polyfunctional aldehydes, ketones, esters, anhydrides or epoxides.

The process of the invention may be carried out in any pressureand temperature-resistant reactor, it being possible in principle to use backmixing or non-backmixing reactors (i.e. reactors having stirred tank or tubular reactor characteristics). Depending on the choice of initiator concentration and composition, the particular process route applied and other parameters, such as temperature and possible temperature profile, the process of the present invention leads to polymers having high or low molecular weights. It is possible to use, for example, stirred tanks, tower reactors, tube reactors and tubular reactors or tube bundle reactors with or without internals. Internals may be static or mobile.

The process is preferably carried out continuously. It is preferred to carry out at least a part of the conversion, particularly conversions of between 50 and 100%, in a non-backmixing reactor or reactor section.

The initiator composition according to the invention makes it possible to significantly reduce the reaction rate or increase the temperature, respectively, without affecting the polymer properties compared to anionic polymerization using an alkali metal organyl; this makes it possible, on the one hand, to spread out the generation of the heat of polymerization over a longer period of time and thus control, in a continuous process, the temperature profile as a function of time or location, e.g. in a tubular reactor. It is possible, for example, to ensure that a high temperature does not occur at initially high monomer concentration, whereas, on the other hand, a trouble-free polymerization is possible at the high temperature which is finally (i.e. at higher conversion) reached while achieving a high space-time yield at the same time. In this process, fouling no longer occurs.

EXAMPLES

Preparation of Initiator Compositions

Appropriate amounts of a 1.6-molar s-butyllithium solution (sBuLi) in cyclohexane (from Chemmetall), a 1-molar (n-butyl)(s-butyl)magnesium solution (DBM) in n-heptane (from Aldrich) and a 1.6-molar solution of triisobutylaluminum (TIBA) in toluene (from Witco) were combined at 25° C. and stirred for at least 30 minutes prior to use.

Example 1

A 2.35 l stirred tank equipped with an anchor stirrer was charged with 320 g of styrene and 1280 g of toluene under nitrogen and heated to 80° C. with stirring. On reaching this temperature, an initiator solution (molar Li/Mg/Al ratio=1/3/0.9) composed of 1.07 ml of a 1.6-molar s-butyllithium solution in cyclohexane, 5.1 ml of a 1-molar solution of DBM in n-heptane and 0.97 ml of a 1.6-molar solution of triisobutylaluminum in toluene was added and the polymerization solution was kept at 80° C. The conversion was 24% after 25 minutes, 51% after 60 minutes, 74% after 2 hours. After 3 hours at 80° C., the polymerization was terminated at a conversion of 86% by adding 4 ml of ethanol. The polymer was obtained in the form of a viscous solution and had a number average molecular weight $M_n$ of 93,600 g/mol and a polydispersity $M_w/M_n$ of 1.51.

Example 2

Example 1 was repeated, except that an initiator solution (molar Li/Mg/Al ratio=1/1.5/0.9) composed of 1.55 ml of a 1.6-molar s-butyllithium solution in cyclohexane, 3.71 ml of a 1-molar DBM solution in n-heptane and 1.4 ml of a 1.6-molar solution of triisobutylaluminum in toluene was used. The conversion was 61% after 30 minutes, 82% after 60 minutes. After 2.5 h at 80° C., the polymerization was terminated at a conversion of 97% by adding 4 ml of ethanol. The polymer was obtained in the form of a 5 viscous solution and had a number average molecular weight $M_n$ of 94,340 g/mol and a polydispersity $M_w/M_n$ of 1.35.

Comparative Experiment 1

Example 2 was repeated, except that an initiator solution (molar Li/Mg ratio=1/1.5) composed of 1.55 ml of a 1.6 molar s-butyllithium solution in cyclohexane, 3.71 ml of a 1-molar DBM solution in n-heptane was used. The polymerization solution could not be maintained at 80° C.

Example 3

Example 1 was repeated, except that an initiator solution (molar Li/Mg/Al ratio=1/2.25/0.9) composed of 3.0 ml of a 1.6-molar s-butyllithium solution in cyclohexane, 11 ml of a 1-molar DBM solution in n-heptane and 2.8 ml of a 1.6-molar solution of triisobutylaluminum in toluene was added to the monomer solution which had been heated to 100° C. The conversion was 29% after 10 minutes and 53% after 25 minutes. After 40 minutes at 100° C., the polymerization was terminated at a conversion of 61% by adding 4 ml of ethanol. The polymer was obtained in the form of a viscous solution and had a number average molecular weight $M_n$ of 161,300 g/mol and a polydispersity $M_w/M_n$ of 1.53.

Comparative Experiment 2

Example 3 was repeated, except that 2.8 ml of a 1.6-molar solution of triisobutylaluminum in toluene, 11 ml of a 1-molar solution of DBM in n-heptane and 3.0 ml of a 1.6-molar s-butyllithium solution in cyclohexane were added to the monomer solution which had been heated to 100° C. After addition of the s-butyllithium solution, a large increase in the temperature of the reactor contents was observed which could not be controlled.

Example 4

A glass ampoule was baked and then charged with 6 g of styrene and 24 g of toluene under inert gas and gas-tightly closed with a septum. The initiator solution composed of appropriate amounts of a 1.6-molar s-butyllithium solution (sBuLi) in cyclohexane (from Aldrich), a 1-molar (n-butyl)(s-butyl)magnesium solution (DBM) in n-heptane (from Chemmetall) and a 1.6-molar solution of triisobutylaluminum (TIBA) in toluene (from Witco) was added using a syringe. The ampoule was then immersed in a heating bath at 100° C. After 12 or 24 hours, respectively, the polymerization was terminated by adding 1 ml of ethanol. The initiator composition, reaction conditions and conversion are summarized in Table 1.

TABLE 1

Polymerization of styrene using an initiator composition composed of s-BuLi/DBM/TIBA

|  | 4a | 4b | 4c | 4d (Comparative Experiment) |
|---|---|---|---|---|
| $(iBu)_3Al$ [mhm]* | 2.5 | 2.5 | 1.4 | 3 |
| (nBu)(sBu)Mg [mhm]* | 4.25 | 3.75 | 4.5 | — |
| s-BuLi [mhm]* | 0.85 | 1.25 | 0.45 | 1 |
| Li/Mg/Al | 1/5/3 | 1/3/2 | 1/10/3 | 1/0/3 |
| Temp. [° C.] | 100 | 100 | 100 | 100 |
| Time [h] | 12 | 12 | 24 | 24 |
| Conversion [%] | 18 | 31 | 23 | 1.4 |

*mhm = mmol per 100 g of styrene

The polymerization of styrene using s-BuLi is almost inhibited by the addition of triisobutylaluminum at a molar Al/Li ratio of 3/1 (4d). Astonishingly, this inhibition is reversed by further addition of DBM (4a, b, c).

Example 5

Example 4 was repeated using the initiator components and reaction conditions summarized in Tables 2a and 2b.

TABLE 2a

Polymerization of styrene
(initiator composition comprising different aluminum component)

| Example | Al compound | DBM [mhm]$^a$ | s-BuLi [mhm]$^a$ | Temp. [° C.] | Time [h] | Conversion [%] |
|---|---|---|---|---|---|---|
| 5a | 1 mhm $Et_2AlOEt$ | 3.75 | 1.25 | 80 | 4 | 59 |
| 5b | 1 mhm $iBu_2AlOEt$ | 3.75 | 1.25 | 80 | 4 | 62 |
| 5c | 1 mhm $(iBu)_3Al$ | 3.75 | 1.25 | 80 | 4 | 49 |

$^a$mhm = mmol per 100 g of styrene

TABLE 2b

Polymerization of styrene
(initiator composition comprising different magnesium component)

| Experiment | Mg compound | (iBu)₃Al [mhm]ᵃ | s-BuLi [mhm]ᵃ | Temp. [° C.] | Time [h] | Conversion [%] |
|---|---|---|---|---|---|---|
| 5d | 4 mhm (sBu)(nBu)Mg | 0.8 | 1.25 | 80 | 4 | 53 |
| 5e | 4 mhm BOMᵇ | 0.8 | 1.25 | 80 | 4 | 47 |
| 5f | 4 mhm (n-hexyl)₂Mg | 0.8 | 1.25 | 80 | 4 | 58 |

ᵃmhm = mmol per 100 g of styrene
ᵇBOM = (n-butyl)$_{1.5}$(n-octyl)$_{0.5}$Mg

Continuous Polymerization of Styrene

Example 6a

The reactor used for the continuous polymerization was a double-jacketed 3 l stirred tank equipped with a standard anchor stirrer. The reactor was designed for a pressure of 60 bar and was kept at a specified temperature by a heat-transfer medium to allow an isothermal polymerization. The temperature of the polymerization mixture was monitored by means of two temperature sensors directly immersed into the polymerization mixture. All operations were carried out under inert gas.

The stirred tank was stirred (100 rpm per minute) and fed with 200 g/h of toluene and 800 g/h of styrene. At the same time, a premixed initiator solution (molar Li/Mg/Al ratio= 1/0.2/0.95) composed of 2.38 ml/h of a 1.6-molar s-butyllithium solution in cyclohexane, 0.76 ml/h of a 1-molar solution of DBM in n-heptane, 2.26 ml/h of a 1.6-molar solution of triisobutylaluminum in toluene and 16.2 ml/h of toluene was premixed and metered in via a common feed line equipped with mixing elements. On reaching a filling level of 3 l, the reaction was switched to continuous mode and the polymerization solution was kept at a bulk temperature of 85° C. A stable, stationary operational state was reached after 12 h, the solids content (SC) being 12%. The number average molecular weight $M_n$ was 46,000 g/mol and the polydispersity Mw/$M_n$ was 2.61.

Example 6a was repeated using the parameters and obtaining the results shown in Table 3 (Examples 6b, c and d):

TABLE 3

Continuous polymerization of styrene in a stirred tank:

| Example | sBuLi [ml/h] | DBM [ml/h] | TIBA [ml/h] | Li/Mg/Al | T [° C.] | SC [%] |
|---|---|---|---|---|---|---|
| 6b | 1.67 | 2.13 | 1.54 | 1/0.8/0.925 | 85 | 22 |
| 6c | 0.93 | 3.3 | 0.93 | 1/2.2/1 | 100 | 15 |
| 6d | 0.78 | 4.0 | 0.98 | 1/3.2/1.25 | 110 | 18 |

Comparative Experiment 3

Example 6a was repeated, except that a solution composed of 2.66 ml/h of a 1.6-molar s-butyllithium solution in cyclohexane and 12.34 ml/h of toluene and a solution composed of 2.58 ml/h of a 1.6-molar solution of triisobutylaluminum in toluene and 10.4 ml/h of toluene (molar Li/Al ratio=0.97) were added via separate feed lines. In the course of several days, the solids content in the stirred tank varied in the range from 3 to 25% by weight and the bulk temperature could not be kept constant at 85° C.

Example 7

A stirred tank similar to the one used in Example 6 was continually charged with 300 g/h of toluene, 1200 g/h of styrene and an initiator solution composed of 0.98 ml/h of a 1.6-molar s-butyllithium solution in cyclohexane, 5.78 ml/h of a 1-molar solution of DBM in n-heptane and 0.78 ml/h of a 1.6-molar solution of triisobutylaluminum in toluene (molar Li/Mg/Al ratio=1/3.7/0.8), premixed via a common feed line, and the mixture was stirred (100 revolutions per minute) at a bulk temperature of 97° C. The effluent from the stirred tank was conveyed into a stirred 4 liter tower reactor. Two heating zones of equal length which were arranged in series were used to set an internal temperature of 120° C. at the end of the first zone and of 162° C. at the end of the second zone. The polymerization mixture was mixed with 20 g/h of a 10% strength by weight solution of methanol in toluene at the outlet of the tower reactor using a mixer, subsequently passed through a tube section heated to 260° C. and released into a vacuum pot kept at 20 mbar via a pressure control valve. The melt was discharged via a screw conveyor and pelletized.

A stable equilibrium state is reached in all parts of the unit after a few hours. The pressure drop across the whole unit was 1.8 bar. The solids content was 41% by weight at the outlet of the stirred tank and 80% by weight at the outlet of the tower reactor, which corresponds to a monomer conversion of 100%. The polystyrene obtained had a molecular weight $M_n$ of 176,000 g/mol and a polydispersity Mw/$M_n$ of 2.52. Analysis showed a styrene content of less than 10 ppm, an ethylbenzene content of less than 10 ppm and a toluene content of 105 ppm.

Example 8

The reactor used for continuous polymerization was a double-jacketed tubular reactor having an internal diameter of 29.7 mm and a length of 2100 mm. The tubular reactor was designed for a pressure of up to 100 bar and for a temperature of up to 350° C. The tubular reactor was kept at a specified temperature by a co-current heat-transfer medium flow and the temperature of the polymerization mixture was monitored by means of three temperature sensors arranged at regular intervals across the reaction section.

The tubular reactor was fed continuously with 1 l/h of styrene, 0.15 l/h of ethylbenzene and 60.37 ml/h of an initiator solution composed of 0.75 ml of a 1.6-molar s-butyllithium solution in cyclohexane, 4.1 ml of a 1-molar solution of DBM in n-heptane, 0.52 ml of a 1.6-molar solution of triisobutylaluminum in toluene and 55 ml of ethylbenzene (molar Li/Mg/Al ratio=1/3.42/0.69) via three separate pumps. The feed materials metered in were each cooled down to 5° C. The temperature of the heat-transfer medium was 90° C. at the tubular reactor inlet. The polymerization solution reached its highest temperature of 208° C. at the outlet of the tubular reactor.

The polymerization mixture was discharged from the tubular reactor and a 20% strength by weight solution of methanol in ethylbenzene was metered in at a rate of 100 ml/h using a HPLC pump and homogenized in a downstream tube section by means of a static mixer. The polymer melt is released into a devolatilization pot kept at 20 mbar via a flow restriction valve, withdrawn by means of screw pump, extruded and pelletized. The resulting polystyrene had a molecular weight $M_w$ of 102,000 and a polydispersity $M_w/M_n$ of 1.41. It contained less than 10 ppm of residual monomeric styrene.

Example 9

The reactor used was a double-jacketed tubular reactor similar to the one used in Example 8, but had a length of 3900 mm and included 5 temperature sensors arranged at regular intervals across the reaction section.

The tubular reactor was fed continuously with 1 l/h of styrene, 0.15 l/h of ethylbenzene and 57.94 ml/h of an initiator solution composed of 1.0 ml of a 1.6-molar s-butyllithium solution in cyclohexane, 3.4 ml of a 1-molar DBM solution in n-heptane, 1.54 ml of a 1.6-molar solution of triisobutylaluminum in toluene and 52 ml of ethylbenzene (molar Li/Mg/Al ratio=1/2.13/1.54) via three separate pumps. The feed materials metered in were each cooled down to 5° C. The temperature of the heat-transfer medium was 110° C. at the tubular reactor inlet. The polymerization solution reached its highest temperature of 191° C. at the outlet of the tubular reactor.

The polymerization mixture was discharged from the tubular reactor and a 20% strength by weight solution of methanol in ethylbenzene was metered in at a rate of 100 ml/h using an HPLC pump and homogenized in a downstream tube section by means of a static mixer. The polymer melt is released into a devolatilization pot kept at 20 mbar via a flow restriction valve, withdrawn by means of a screw pump, extruded and pelletized. The resulting polystyrene had a molecular weight $M_w$ of 142,000 and a polydispersity $M_w/M_n$ of 1.86. It contained less than 10 ppm of residual monomeric styrene.

We claim:

1. A process for the homopolymerization of vinylaromatic monomers or the block copolymerization of vinylaromatic monomers and dienes, which comprises polymerizing the monomers in the presence of an initiator composition consisting of at least one alkali metal organyl, at least one magnesium organyl and at least one aluminum organyl.

2. A process as claimed in claim 1, wherein the alkali metal organyl used is a lithium organyl.

3. A process as claimed in claims 1, wherein the molar ratio of magnesium to alkali metal is in the range from 0.2 to 3.8.

4. A process as claimed in claim 1, wherein the molar ratio of aluminum to alkali metal is in the range from 0.2 to 4.

5. A process as claimed in claim 1, wherein the molar ratio of magnesium to aluminum is in the range from 0.05 to 8.

6. A process for the homopolymerization of styrene, which comprises polymerizing styrene in the presence of an initiator composition consisting essentially of at least one alkali metal organyl, at least one magnesium organyl and at least one aluminum organyl.

7. A process as claimed in claim 1, wherein the polymerization is carried out at an initial monomer concentration in the range from 50 to 100 percent by volume.

8. A process as claimed in claim 1, wherein the polymerization is carried out continuously.

9. A process as claimed in claim 1, wherein at least a part of the conversion is carried out in a non-backmixing reactor or reactor section.

10. An initiator composition consisting of at least one alkali metal organyl, at least one magnesium organyl and at least one aluminum organyl, wherein a) the molar ratio of magnesium to alkali metal is in the range from 0.2 to 3.8, b) the molar ratio of aluminum to alkali metal is in the range from 0.2 to 4.

11. A process for the preparation of an initiator composition consisting of at least one alkali metal organyl, at least one magnesium organyl and at least one aluminum organyl, wherein a) the molar ratio of magnesium to alkali metal is in the range from 0.2 to 3.8, b) the molar ratio of aluminum to alkali metal is in the range from 0.2 to 4, which comprises mixing together the metal organyls, dissolved in inert hydrocarbons, and aging at temperature in the range from 0 to 120° C. for at least 5 minutes.

12. A process for producing polystyrene, styrene/butadiene block copolymers or high-impact polystyrene comprising a homopolymerization step of styrene in the presence of an initiator composition consisting of at least one alkali metal organyl, at least one magnesium organyl and at least one aluminum organyl.

* * * * *